United States Patent
Raja

(10) Patent No.: US 11,571,715 B2
(45) Date of Patent: Feb. 7, 2023

(54) SEQUENCING STATION

(71) Applicant: ABB Schweiz AG, Baden (CH)

(72) Inventor: Ali Raja, Solihull (GB)

(73) Assignee: ABB Schweiz AG, Baden (CH)

( * ) Notice: Subject to any disclaimer, the term of this patent is extended or adjusted under 35 U.S.C. 154(b) by 573 days.

(21) Appl. No.: 16/315,860

(22) PCT Filed: Jul. 7, 2016

(86) PCT No.: PCT/EP2016/066155
§ 371 (c)(1),
(2) Date: Jan. 7, 2019

(87) PCT Pub. No.: WO2018/006966
PCT Pub. Date: Jan. 11, 2018

(65) Prior Publication Data
US 2020/0179987 A1   Jun. 11, 2020

(51) Int. Cl.
*B07C 5/36* (2006.01)
(52) U.S. Cl.
CPC ..................... *B07C 5/36* (2013.01)
(58) Field of Classification Search
CPC ........ B07C 5/36; B65G 60/00; B65G 1/1373; B25J 11/00
See application file for complete search history.

(56) References Cited

U.S. PATENT DOCUMENTS

| | | | |
|---|---|---|---|
| 9,751,693 B1* | 9/2017 | Battles | B25J 9/0093 |
| 2007/0280814 A1* | 12/2007 | Morency | B65G 1/1378 |
| | | | 414/788 |
| 2008/0181753 A1 | 7/2008 | Bastian et al. | |
| 2011/0130868 A1 | 6/2011 | Baumann | |
| 2014/0135976 A1 | 5/2014 | Gue et al. | |
| 2015/0284192 A1* | 10/2015 | Hirschek | B65G 57/301 |
| | | | 414/222.08 |
| 2016/0039550 A1 | 2/2016 | Boudreau et al. | |
| 2016/0347545 A1* | 12/2016 | Lindbo | B65G 61/00 |
| 2018/0265297 A1* | 9/2018 | Nakano | B66F 9/06 |

FOREIGN PATENT DOCUMENTS

| | | |
|---|---|---|
| DE | 19940978 A1 | 3/2001 |
| WO | 2007012099 A1 | 2/2007 |
| WO | 2012077018 A1 | 6/2012 |

(Continued)

OTHER PUBLICATIONS

ABB Atuomation Technologies AB Robotics, "Product Specification Articulated robot," p. 6 (Year: 2004).*

(Continued)

*Primary Examiner* — Patrick H Mackey
(74) *Attorney, Agent, or Firm* — Whitmyer IP Group LLC

(57) ABSTRACT

A sequencing station includes a buffer including a plurality of positions, each position being configured to receive an item. An industrial robot is configured to place items to the positions and pick items from the positions, and a transport device is configured to move items into and out of a work area of the robot. The robot has at least four degrees of freedom. A robot with four degrees of freedom manages both sequencing and restacking tasks faster and with lower investment than conventional machines dedicated to specific tasks.

13 Claims, 1 Drawing Sheet

(56) References Cited

FOREIGN PATENT DOCUMENTS

WO  2015118171  A1  8/2015
WO  2015189849  A1  12/2015

OTHER PUBLICATIONS

International Search Report & Written Opinion of the International Searching Authority Application No. PCT/EP2016/066155 Completed: Mar. 10, 2017; dated Mar. 17, 2017 10 Pages.
European Office Action; Application No. 16 738 718.2; dated Apr. 12, 2021; 4 Pages.

* cited by examiner

SEQUENCING STATION

TECHNICAL FIELD

The present invention relates to sequencing stations used to dispatch items in a specific order, eventually also arranged in specific groups. Such sequencing stations may e.g. be part of a warehouse management system arranged to deliver parts to assembly workers putting together customer orders.

BACKGROUND

It is conventionally known to sequence items with hard automated sequencers provided solely for this purpose. A typical conventional sequencer comprises a buffer in the form of a tower temporarily storing items, and a manipulator placing items into the buffer and picking items out of the buffer in a specific order. Such manipulator typically comprises exclusively sliding kinematic pairs each allowing solely a linear movement between the respective elements, and consequently only has translational degrees of freedom (DOF), typically three DOF.

It is furthermore conventionally known to restack items with the help of restacking machines provided solely for this purpose. A typical conventional restacking machine comprises a manipulator capable e.g. of re-ordering a plurality of plastic bins stacked on each other. The reason for piling a plurality of bins on each other can e.g. be to save space on a conveyor.

A conventional sequencer does not manage a restacking task, and a conventional restacking machine does not manage a sequencing task. These two machines dedicated to specific tasks are expensive in purchase, and both expensive and inflexible in operation.

DE19940978A1 discloses a warehouse system not intended for sequencing but for automatically delivering goods from a storage by the means of industrial robots and conveyors.

Further warehouse or material handling systems are known e.g. from US20080181753A1, US20140135976A1, US20160039550A1, WO200712099A1 and WO201277018A1.

There remains a desire to mitigate the drawbacks of conventional sequencing systems.

SUMMARY

One object of the invention is to provide an improved sequencing station which manages both sequencing and restacking tasks, and which is flexible in operation in being e.g. easy to relocate.

This object is achieved by the device according to the invention.

The invention is based on the realization that a robot with four degrees of freedom manages both sequencing and restacking tasks faster and with lower investment than conventional machines dedicated to specific tasks.

According to a first aspect of the invention, there is provided a sequencing station comprising: a buffer with a plurality of positions, each position being configured to receive an item, an industrial robot configured to place items to the positions and pick the items from the positions, and a transport device configured to move the items into and out of a work area of the robot. The robot has at least four degrees of freedom.

According to one embodiment of the invention, at least one of the degrees of freedom is achieved by means of a rotational kinematic pair.

According to one embodiment of the invention, the sequencing station is configured to move a plurality of items into the work area in a first order, and to move the plurality of items out of the work area in a second order, the second order being different from the first order.

According to one embodiment of the invention further comprises a plurality of identical items.

According to one embodiment of the invention, the items are bins each of which contains at least one component.

According to one embodiment of the invention, the sequencing station is configured to move the items into the work area at least partially one by one, and to move the items out of the work area at least partially one by one.

According to one embodiment of the invention, the sequencing station is configured to move the items into the work area at least partially one by one, and to move the items out of the work area at least partially in groups.

According to one embodiment of the invention, the sequencing station is configured to move the items into the work area at least partially in groups, and to move the items out of the work area at least partially one by one.

According to one embodiment of the invention, the sequencing station is configured to move the items into the work area at least partially in groups, and to move the items out of the work area at least partially in groups.

According to one embodiment of the invention, at last one group comprises a plurality of items stacked on each other.

According to one embodiment of the invention, the sequencing station is configured to move a plurality of items into the work area in a first pile comprising a plurality of items stacked on each other in a first order, and to move the plurality of items out of the work area in a second pile comprising the plurality of items in a second order, the second order being different from the first order.

According to one embodiment of the invention, the robot has at least five, such as six degrees of freedom.

According to one embodiment of the invention, all of the degrees of freedom are achieved by means of rotational kinematic pairs.

BRIEF DESCRIPTION OF DRAWINGS

The invention will be explained in greater detail with reference to the accompanying drawings, wherein.

DETAILED DESCRIPTION

Figure 1:
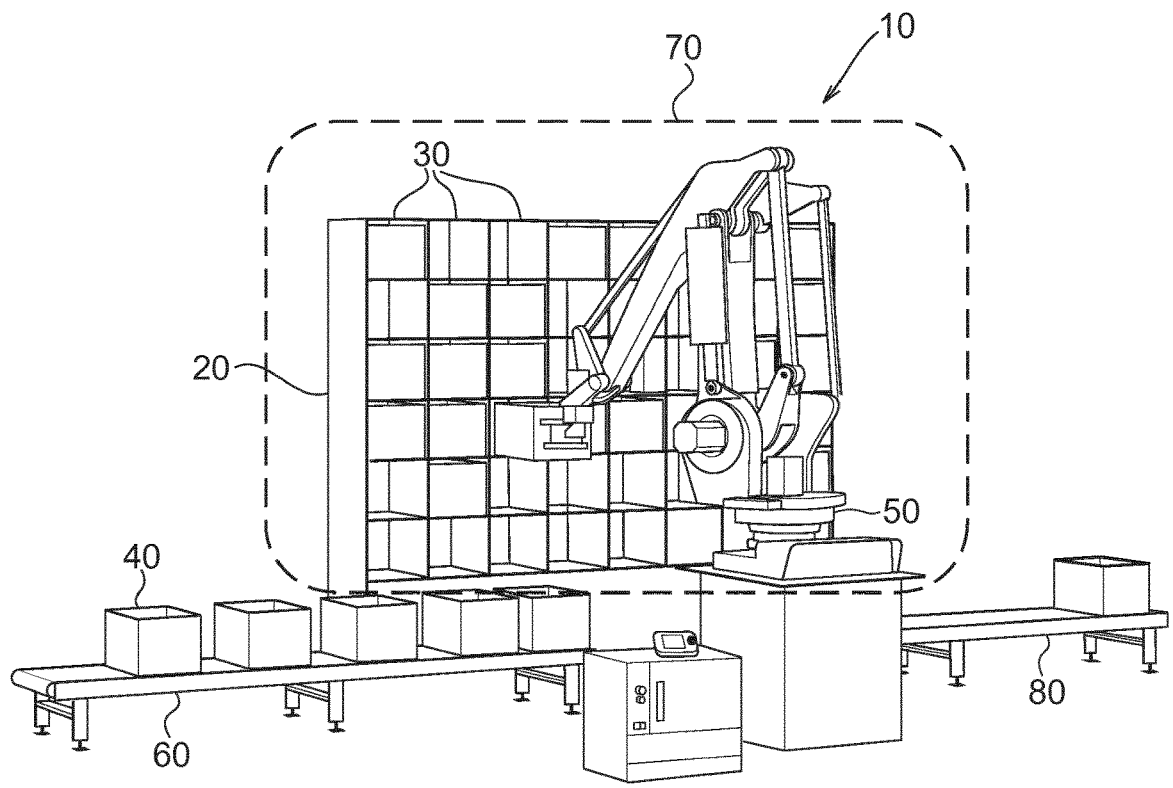
FIG. 1 shows a sequencing station according to one embodiment of the invention.

Referring to FIG. 1, a sequencing station 10 according to one embodiment of the invention comprises a buffer 20 comprising a plurality of positions in the form of slots 30. Each slot 30 is configured to receive a bin 40. The sequencing station 10 further comprises an industrial robot 50 with six DOFs achieved by the means of rotational kinematic pairs. The robot 50 is configured to pick bins 40 from a first conveyor 60 moving the bins 40 into a work area 70 of the robot 50 in a first order, and to place the bins 40 into the slots 30 to temporarily store them. The robot 50 is further configured to pick the bins 40 from the slots 30, and place them on a second conveyor 80 in a second order, the second conveyor 80 moving the bins 40 out of the work area 70 in the second order. Together the first conveyor 60 and the second conveyor 80 thereby constitute a transport device configured to move items into and out of a work area 70 of the robot 50. The second order is typically different from the first order. All the bins 40 can be identical with each other, and each of them may contain one or more components.

Figure 2:
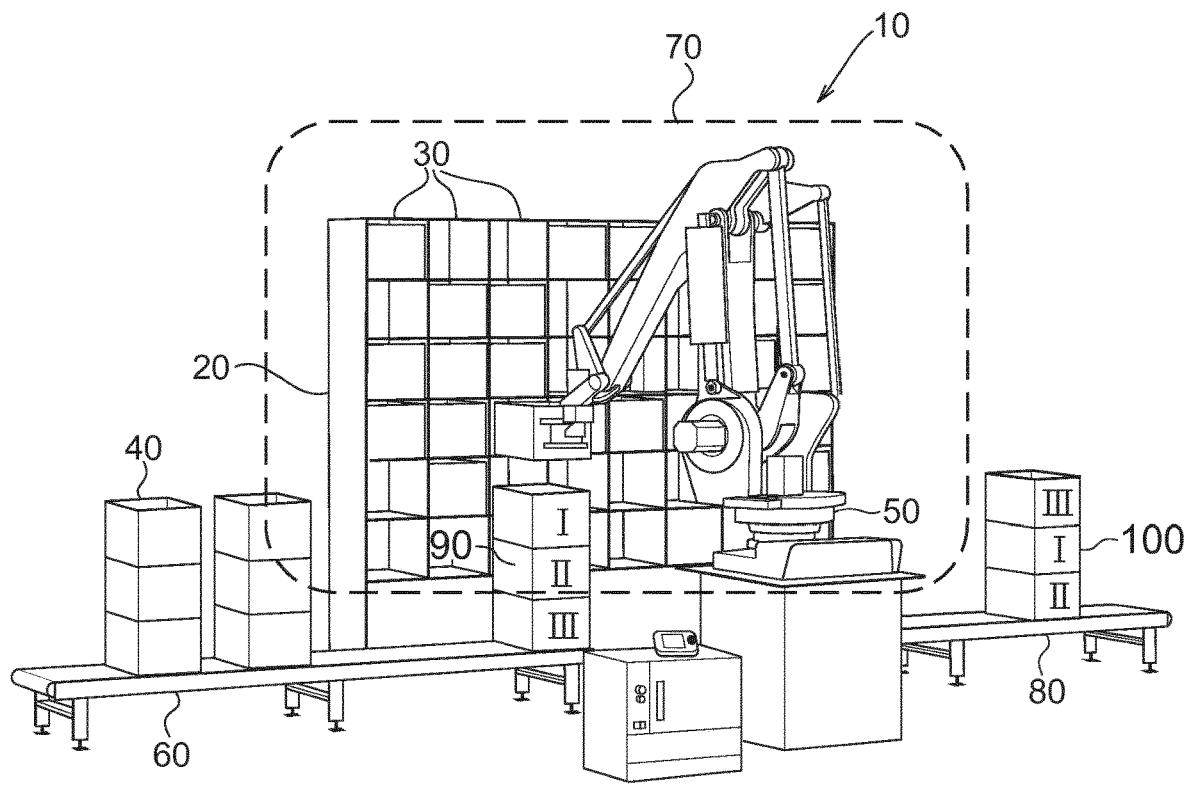
FIG. 2 shows a sequencing station according to one embodiment of the invention.

Referring to FIG. 2, according to one embodiment of the invention, the first conveyor 60 is configured to move a group of bins 40 into the work area 70 of the robot 50, the group of bins 40 forming a first pile 90 comprising a plurality of bins 40 stacked on each other in a first order. The robot 50 is configured to pick the bins 40 from the first pile 90, and to place them into the slots 30 to temporarily store them. The robot 50 is further configured to pick the bins 40 from the slots 30, and to stack them up on each other on the second conveyor 80 to form a second pile 100 comprising a plurality of bins 40 in a second order. The second order is typically different from the first order. Moreover, the second pile 100 may consist of different bins 40 than the first pile 90. The second conveyor 80 is configured to move the group of bins 40 out of the work area 70 of the robot 50.

The invention is not limited to the embodiments shown above, but the person skilled in the art may modify them in a plurality of ways within the scope of the invention as defined by the claims. Thus, bins 40 moved into the work area 70 of the robot 50 one by one are not necessarily moved out of the same one by one, but can be moved out in groups, such as in piles. Similarly, bins 40 moved into the work area 70 of the robot 50 in groups, such as in piles, are not necessarily moved out of the same in groups, but can be moved out one by one. Bins 40 moved into and out of the work area 70 of the robot 50 can constitute any combination of individual bins 40 and bin groups.

The invention claimed is:

1. A sequencing station comprising:
   a buffer with a plurality of positions, each position being configured to receive an item,
   an industrial robot configured to place items to the positions and pick the items from the positions, the robot having at least four degrees of freedom, the items being bins each of which contains at least one component, and
   a transport device configured to move the items into and out of a work area of the robot,
   wherein the sequencing station is configured to move a plurality of items into the work area in a first order and move the plurality of items out of the work area in a second order, the second order being different from the first order,
   wherein the sequencing station is configured to move the items into the work area at least partially one by one and move the items out of the work area at least partially one by one.

2. The sequencing station according to claim 1, wherein at least one of the degrees of freedom is achieved by means of a rotational kinematic pair.

3. The sequencing station according to claim 2, further comprising a plurality of identical items.

4. The sequencing station according to claim 2, wherein the sequencing station is configured to move the items into the work area at least partially one by one, and to move the items out of the work area at least partially in groups.

5. The sequencing station according to claim 1, further comprising a plurality of identical items.

6. The sequencing station according to claim 1, wherein the sequencing station is configured to move the items into the work area at least partially one by one, and to move the items out of the work area at least partially in groups.

7. The sequencing station according to claim 6, wherein at last one group includes a plurality of items stacked on each other.

8. The sequencing station according to claim 1, wherein the sequencing station is configured to move the items into the work area at least partially in groups, and to move the items out of the work area at least partially one by one.

9. The sequencing station according to claim 1, wherein the sequencing station is configured to move the items into the work area at least partially in groups, and to move the items out of the work area at least partially in groups.

10. The sequencing station according to claim 9, wherein the sequencing station is configured to move a plurality of items into the work area in a first pile including a plurality of items stacked on each other in a first order, and to move the plurality of items out of the work area in a second pile including the plurality of items in a second order, the second order being different from the first order.

11. The sequencing station according to claim 1, wherein the robot has at least five degrees of freedom.

12. The sequencing station according to claim 11, wherein all of the degrees of freedom are achieved by means of rotational kinematic pairs.

13. The sequencing station according to claim 1, wherein the robot has at least six degrees of freedom.

* * * * *